US008774608B2

(12) United States Patent
Kummer et al.

(10) Patent No.: US 8,774,608 B2
(45) Date of Patent: *Jul. 8, 2014

(54) SYSTEM AND METHOD FOR MEMORY JUMPING WITHIN STORED INSTANCES OF CONTENT

(71) Applicant: EchoStar Technologies, LLC, Englewood, CO (US)

(72) Inventors: David A. Kummer, Highlands Ranch, CO (US); William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,423

(22) Filed: Oct. 28, 2013

(65) Prior Publication Data
US 2014/0050462 A1 Feb. 20, 2014

Related U.S. Application Data

(63) Continuation of application No. 13/291,014, filed on Nov. 7, 2011, now Pat. No. 8,606,088.

(60) Provisional application No. 61/526,379, filed on Aug. 23, 2011.

(51) Int. Cl.
*H04N 9/80* (2006.01)
*H04N 5/783* (2006.01)
*H04N 5/84* (2006.01)

(52) U.S. Cl.
CPC ............... *H04N 5/783* (2013.01); *H04N 9/80* (2013.01); *H04N 5/84* (2013.01)

USPC ............ 386/343; 386/241; 386/344; 386/345

(58) Field of Classification Search
CPC ............ H04N 5/783; H04N 9/80; H04N 5/84
USPC .................... 386/343, 241, 344, 345
See application file for complete search history.

(56) References Cited

U.S. PATENT DOCUMENTS

| 6,701,528 | B1 * | 3/2004 | Arsenault et al. ............... 725/89 |
| 7,024,676 | B1 * | 4/2006 | Klopfenstein .................. 725/49 |
| 7,926,078 | B2 * | 4/2011 | Arsenault et al. ............... 725/89 |
| 7,962,937 | B2 * | 6/2011 | Cho et al. ......................... 725/44 |
| 8,437,622 | B2 * | 5/2013 | Casagrande ................... 386/291 |
| 8,447,170 | B2 * | 5/2013 | Casagrande ................... 386/296 |
| 2003/0110514 | A1 * | 6/2003 | West et al. ..................... 725/134 |
| 2005/0229213 | A1 * | 10/2005 | Ellis et al. ....................... 725/58 |
| 2005/0271365 | A1 * | 12/2005 | Hisatomi ......................... 386/94 |
| 2006/0206819 | A1 * | 9/2006 | Tsuji et al. .................... 715/716 |

(Continued)

Primary Examiner — Gelek W Topgyal
(74) Attorney, Agent, or Firm — Kilpatrick Townsend & Stockton LLP

(57) ABSTRACT

Content receivers may simultaneously record multiple instances of content for multiple programming channels based on content provider instructions. Systems and methods utilize the content receivers to perform memory jumping operations within files having the simultaneously recorded multiple instance of content stored therein. The memory jumping operation may jump locations within the file corresponding to a predetermined memory jumping operation timeframe, and in order to account for the variability in the recording bit rate and therefore the playing of the instance of content, the jump locations in the memory jumping operation may be dynamically adjusted based on recording bit rates.

20 Claims, 4 Drawing Sheets

(56) References Cited

U.S. PATENT DOCUMENTS

| | | | |
|---|---|---|---|
| 2006/0215993 A1* | 9/2006 | Yamada | 386/83 |
| 2007/0157253 A1* | 7/2007 | Ellis et al. | 725/61 |
| 2008/0046929 A1* | 2/2008 | Cho et al. | 725/46 |
| 2008/0092164 A1* | 4/2008 | Agarwal et al. | 725/40 |
| 2008/0216119 A1* | 9/2008 | Pfeffer et al. | 725/40 |
| 2008/0216136 A1* | 9/2008 | Pfeffer et al. | 725/100 |
| 2009/0178098 A1* | 7/2009 | Westbrook et al. | 725/115 |
| 2010/0020794 A1* | 1/2010 | Cholas et al. | 370/389 |
| 2010/0158479 A1* | 6/2010 | Craner | 386/92 |
| 2011/0078750 A1* | 3/2011 | Tam et al. | 725/88 |
| 2012/0278837 A1* | 11/2012 | Curtis et al. | 725/42 |
| 2012/0311534 A1* | 12/2012 | Fox et al. | 717/120 |
| 2013/0051555 A1* | 2/2013 | Martch et al. | 380/210 |
| 2013/0051764 A1* | 2/2013 | Casagrande | 386/244 |
| 2013/0051766 A1* | 2/2013 | Martch et al. | 386/248 |
| 2013/0051773 A1* | 2/2013 | Casagrande | 386/296 |
| 2013/0054579 A1* | 2/2013 | Kennedy | 707/723 |
| 2013/0055304 A1* | 2/2013 | Kirby et al. | 725/31 |
| 2013/0055305 A1* | 2/2013 | Martch et al. | 725/31 |
| 2013/0055310 A1* | 2/2013 | VanDuyn et al. | 725/40 |
| 2013/0055311 A1* | 2/2013 | Kirby et al. | 725/44 |
| 2013/0055314 A1* | 2/2013 | Martch | 725/58 |
| 2013/0055333 A1* | 2/2013 | Kummer | 725/134 |

* cited by examiner

US 8,774,608 B2

SYSTEM AND METHOD FOR MEMORY JUMPING WITHIN STORED INSTANCES OF CONTENT

CROSS-REFERENCES TO RELATED APPLICATIONS

This application is a continuation of U.S. patent application Ser. No. 13/291,014, filed Nov. 7, 2011, and entitled "SYSTEM AND METHOD FOR MEMORY JUMPING WITHIN STORED INSTANCES OF CONTENT", which claims priority from U.S. Provisional Patent Application No. 61/526,379, filed Aug. 23, 2011. The entire contents of the previous applications are incorporated herein by reference for all purposes.

FIELD OF THE INVENTION

This disclosure relates generally to utilizing content receivers to perform memory jumping operations and to dynamically adjust memory jumping operations based on a recording bit rate for one or more instances of content simultaneously recorded.

SUMMARY

The present disclosure discloses systems and methods for performing memory jumping operations utilizing a content receiver. The content receiver generally records multiple instances of content simultaneously and stores the multiple instances of content as a single file. Upon replay of one of the multiple instances of content, the content receiver performs memory jumping operations by causing the content receiver to skip ahead or move backward within the file corresponding to a memory jumping operation timeframe. Each memory jumping operation timeframe may correspond to a predefined time period of one or more seconds, minutes or hours. For example, a predefined memory jumping operation timeframe may be 30 seconds, and in response to receiving a selection to perform the memory jumping operation (such as by utilizing a controller, e.g., a remote control), the content receiver jumps ahead or back within the file to a location corresponding to 30 seconds. However, because multiple instances of content are recorded simultaneously, and are generally stored within a single file, the content receiver may be required to move to different locations within the file to reach the file location associated with the 30 second timeframe selected. This is because the content receiver may record the instances of content at varying bit rates, for example, depending on the recording capacity of the content receiver, on the number of instances of content recorded simultaneously, on the actual and/or average bit rate of recording of one, some or all of the instances of content, and so on. The content receiver is therefore configured to dynamically adjust movement within the file to perform the memory jumping operation (e.g., having a predefined timeframe) based on utilizing information associated recording bit rates, such as the aggregate recording bit rate for the simultaneously recorded multiple instances of content.

In one implementation, a method for performing memory jumping operations utilizing a content receiver includes replaying an instance of content from a file stored within the content receiver, the file comprising multiple instances of content recorded simultaneously from a plurality of programming channels; receiving a selection for performing a memory jumping operation at a first time within the instance of content; in response to receiving the selection, performing the memory jumping operation by movement to a location within the file corresponding to a predefined memory jumping operation timeframe; and replaying the instance of content upon performing the memory jumping operation. The content receiver dynamically adjusts the location movement within the file such that the location movement corresponds to the predefined memory jumping operation timeframe, and the dynamic adjustment is at least based on an aggregate recording bit rate of the simultaneously recorded multiple instances of content.

In another implementation, a system for performing memory jumping operations uses a content receiver that includes a processing unit for simultaneously recording multiple instances of content from a plurality of programming channels; a data storage unit for storing the simultaneously recorded multiple instances of content from the plurality of programming channels within a file; and a communications unit for receiving selections and for transmitting a replayed instance of content from the file to a content display device. The content receiver receives a selection for performing a memory jumping operation at a first time within the instance of content, and in response to receiving the selection, the processing unit performs the memory jumping operation by executing instructions for the data storage unit to read a different location within the file corresponding to a predefined memory jumping operation timeframe at a second time within the instance of content, and the communications unit plays the instance of content at the second time within the instance of content. The processing unit dynamically adjusts the different location within the file the data storage unit reads to correspond to the predefined memory jumping operation timeframe based on an aggregate recording bit rate of the simultaneously recorded multiple instances of content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
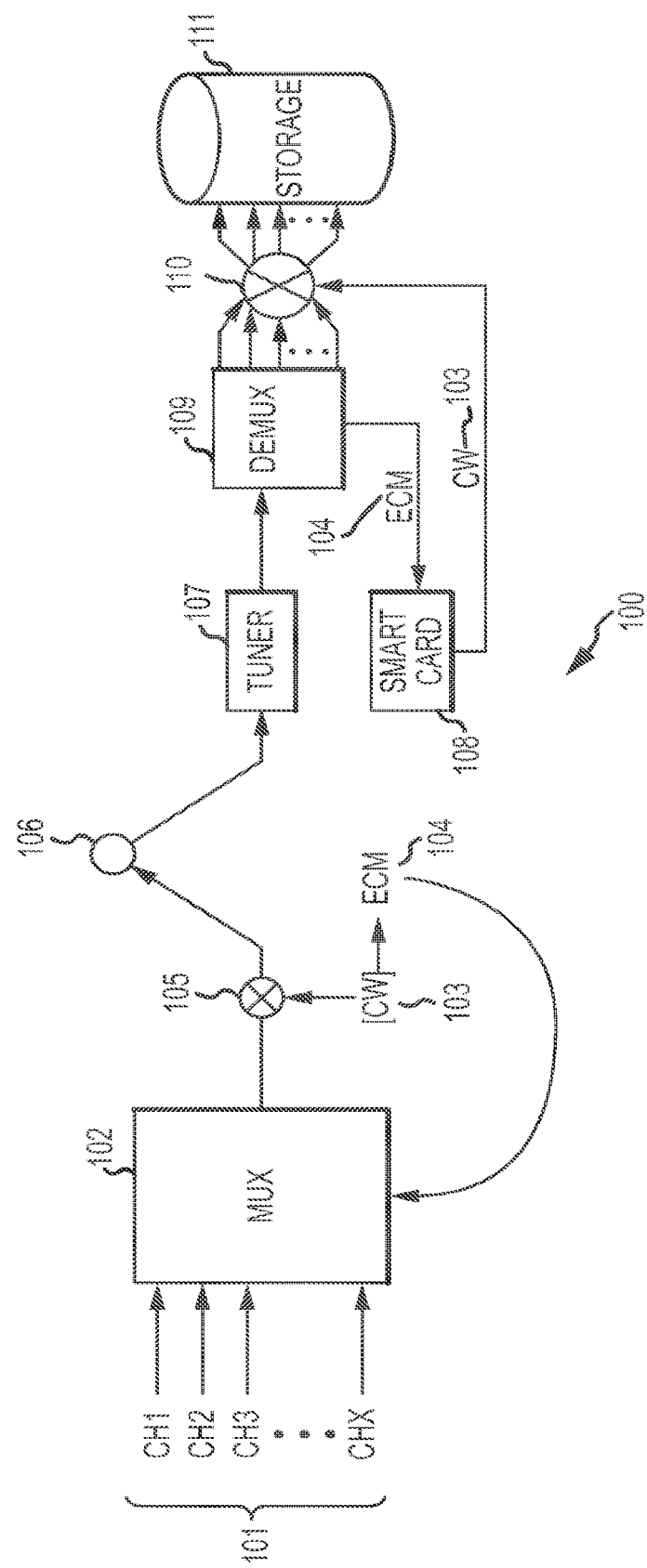
FIG. 1 is a block diagram illustrating a system for automatically recording multiple instances of content from one or more programming providers.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the control word prior to multiplexing. In another example, in some implementations, the data received via the tuned frequency may be demultiplexed before being individually descrambled utilizing the control word.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file). For example, five instances of content may be received at a transponder and simultaneously recorded by the content receiver based on predefined recording parameters, and each of the instances of content may record at an average variable bit rate. More specifically, one instance of content may be received by the transponder and be recorded by the content receiver at an average of 1 Mb/sec (Megabits per second), a second instance of content at an average of 2 Mb/sec, a third at 3 Mb/sec, a fourth instance of content at an average of 4 Mb/sec, and a fifth instance of content at 5 Mb/sec. In this example, the transponder receives and the content receiver records the five instances of content at an aggregate bit rate of 15 Mb/sec (e.g., the aggregate of 1 Mb/sec, 2 Mb/sec, 3 Mb/sec, 4 Mb/sec, and 5 Mb/sec). Thus, playing one of the five instances of content involves utilizing the content receiver to read the full file at 15 Mb/sec but discarding all but the one instance of content that is desired.

In some implementations, the aggregate recording bit rate may be less than the maximum available recording bit rate. Thus, the aggregate bit rate of 15 Mb/sec for a transponder may be less than the maximum available bit rate of, for example, up to 40 Mb/sec. Accordingly, playing an instance of recorded content involves the content receiver determining the aggregate recording bit rate for the file of the simultaneously recorded multiple instances of content and playing the instance of content based on the aggregate recording bit rate.

In another example, a file of ten simultaneously recorded instances of content may be recorded at a bit rate of 40 Mb/sec (e.g., a maximum aggregate bit rate for the transponder), having a recording bit rate (or an average bit rate) of 4 Mb/sec playing one of the ten instances of content involves utilizing the content receiver to incrementally read the file in increments of 4 Mb/sec of the total 40 Mb/sec recorded. A first show may be associated with the content recorded at the first 4 Mb/sec (e.g., Mb 1-4) of the total 40 Mb/sec, a second show may be associated with the content recorded at the second 4 Mb/sec (e.g., Mb 5-8), and so on.

In the examples above, it will be appreciated that the multiple instances of content may be recorded based on statistical multiplexing utilizing communicatively coupled video compressors that determine the bandwidth of data needed for compressing the instance of content to be recorded. This enables the recording (and replay) bit rate of an instance of content to be variable within the recording stream, and accordingly the multiple instances of content may be recorded each at varying bitrates. For a given transponder, as the percentage of the transport stream that is being recorded increases, the variability of the recording data drops. That is, if 100 percent of the stream is being recorded (e.g. at the maximum aggregate bit rate for the transponder), then the variability is zero. As a result, the average recording bit rate of many varying streams may be less noisy. In the examples above, it will also be appreciated that the aggregate recording bit rate may be calculated periodically or in real time.

In addition to replaying recorded content, content receivers are commonly instructed to perform "trick plays" in which the content receiver reads the recorded content at a different location within the file corresponding to a predetermined timeframe within the instance of content, e.g., in a fast-forward or rewind operation. Memory jumping operations may involve moving a content receiver head or pointer forward or backward to a different position, location or address within the media, electronically moving to a different address within the media, and so on. This memory jumping operation may involve reading the file at a different location compared to the initial file position corresponding to a few seconds to a few hours (e.g., 1 second; 2, 5, 10, 30, 60 or 90 seconds; 2, 5, 10, 15 or 30 minutes; 1 hour; 2, 3, 4, 5, 6 or 12 hours, and so on) and continuing the play of the instance of content after moving to the different location. Memory jumping operations may also involve playing the instance of content at a decreased or an increased rate, such as at a decreased replay rate at, for example, at 0.25×, 0.5×, or 0.75× speed, or an increased rate of replay at, for example, at 1.25×, 1.5×, 2×, 4×, 8×, 16×, 32×, or 64× speed.

The present disclosure discloses systems and methods for performing memory jumping operations within a file containing a plurality of simultaneously recorded instances of content. Memory jumping operations enable "trick plays" to be performed by the content receiver during playing of one of the plurality of simultaneously recorded instances of content.

Generally, the simultaneously recorded instances of content may be written into a single file that enables the memory jumping operation to be performed for the single instance of content being played, which forms a portion of the aggregate file of the plurality of instances of content. Because the file is an aggregate of multiple instances of content, each recorded at varying bit rates, the memory jumping operation involves less variability due to the aggregate file averaging out the variable recording bit rates for the multiple instances of content. Thus, in comparison to a file having a single instance of content having been recorded at a variable bit rate, the file recorded at an aggregate bit rate results in a reduced variability. In addition, the single file is written without adding time-based markers and without adding index files. In addition, the content receiver generally does not require start code detectors for each program, thereby simplifying hardware and processing operations of the content receiver.

In some implementations, the content receiver records some or all of the contents of a transponder at a known bit rate (e.g., an aggregate bit rate of a plurality of shows), the content receiver knows or predicts the recording bit rate or average recording bit rate of each of the multiple instances of content simultaneously recorded, and utilizes some or all of this information to estimate the location within the file that the content receiver reads in order to perform the type of memory jump selected (e.g., the timeframe selected). Memory jumping operations may be selected by a user utilizing a controller (such as a remote control) for example.

In some implementations, the aggregate recording bit rate, the aggregate average recording bit rate, or combinations thereof, may be known, calculated or predicted and utilized to estimate the location within the file corresponding to the memory jumping operation. The memory jumping operations according to the implementations provided herein, are larger memory jumps compared to performing similar "trick plays" for a file containing a single instance of content. For example, a file with five simultaneously recorded multiple instances of content for three hours having been recorded utilizing the system of FIG. 1, may be five times larger than a file with a single instance of content recorded for three hours. Thus, the content receiver is required to navigate relatively larger amounts of data within the file when performing the memory jumping operations provided herein.

In addition, because the multiple instances of content may be recorded at different rates (e.g., varying bit rates), and the memory jumping operation generally involves moving locations within a file of the stored instances of content corresponding to a predefined timeframe (e.g., 30 seconds or 1 minute), the content receivers provided herein are configured to account for the variability in the bit rate of recording (e.g., the variability in the aggregate recording bit rate, the variability in the average recording bit rate some or all of the instances of content recorded, combinations thereof, and so on) by dynamically adjusting the location change within the file based on information associated with the recording bit rates.

Referring to the example above in which five instances of content are recorded at an aggregate bit rate of 15 Mb/sec, performing a memory jumping operation may involve the content receiver determining the aggregate bit rate of recording (15 Mb/sec), and the content receiver may perform a memory jumping operation having a 30 second timeframe by moving to a location within the file by 450 Mb (30 sec.×15 Mb/sec). Referring to the example above in which ten instances of content are recorded simultaneously at an aggregate bit rate of 40 Mb/sec, performing a 30 second memory jumping operation may involve moving to a location within the file by 1.2 kB. In some implementations, the actual or average bit rate for one or more instances of content may be calculated periodically or in real time to enable the memory jumping operation parameters to be dynamically adjusted to account for changes in the recording bit rate of the instance of content. In some implementations, the each of the multiple instances simultaneously recorded may be assigned a priority for bandwidth (e.g., the higher priority instance of content receives a larger recording bandwidth) and after performing the memory jump operation, the content receiver may search for the instance of content within the aggregate file based on the assigned priority.

In some implementations, the content receiver may move locations within the file based on the memory jump operation (e.g., the predefined timeframe), may read the content to determine whether jump position corresponds with the predefined timeframe associated with the memory jump operation, and may automatically adjust the location within the file based on whether the jump position corresponds to a timeframe that is more or less than the memory jumping operation timeframe. This refinement operation may adjust locations within the file multiple times to enable the content receiver to play the instance of content beginning at, or close to, the predefined timeframe associated with the memory jumping operation.

Figure 2:
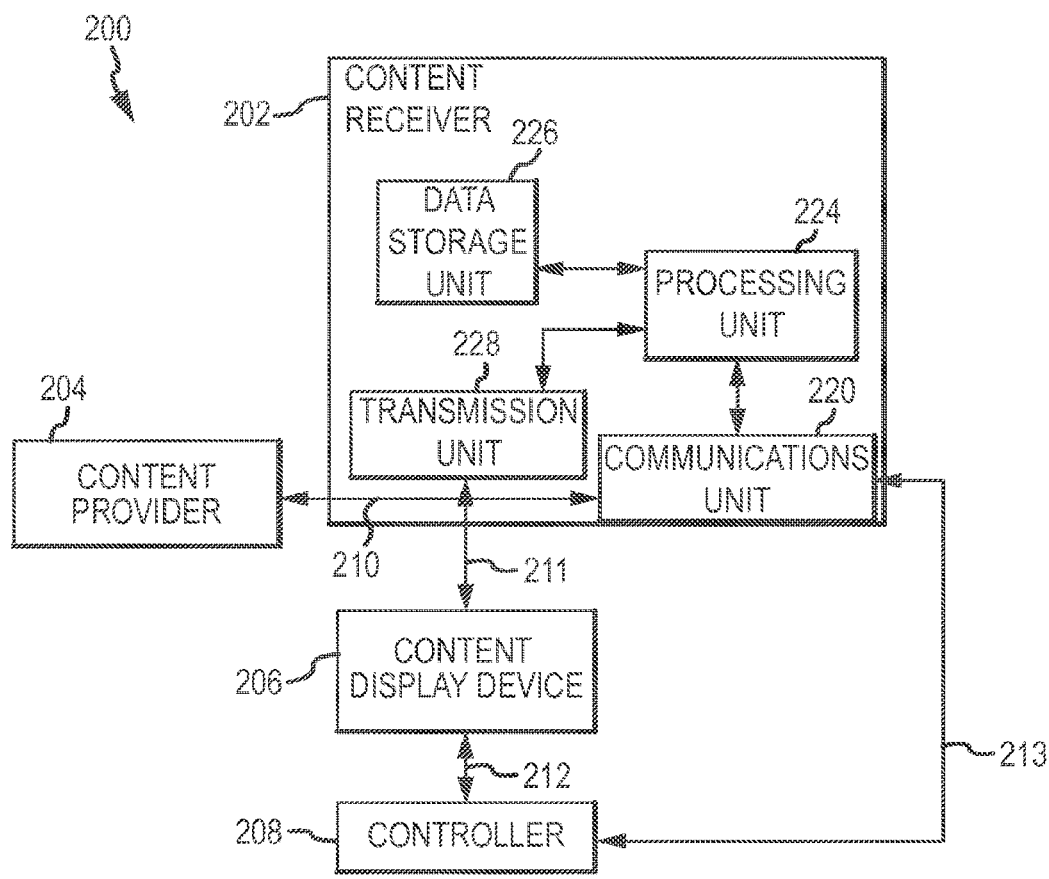
FIG. 2 is a block diagram illustrating a system for memory jumping.

FIG. 2 is a block diagram illustrating a system 200 for executing memory jumping operations within a file containing multiple instances of content simultaneously recorded. The system 200 may be at least partly incorporated into the system of FIG. 1. The system 200 includes a content receiver 202 (such as a set top box) for receiving and transmitting content (such as television programming and on screen display content), a content provider 204 for transmitting the content (such as a satellite or cable programming service provider), a content display device 206 for receiving and displaying the content (such as a television), and a controller 208 (such as a remote control) for transmitting data such as control signals to the content receiver 202.

The content receiver 202 is a device for receiving content from the content provider 204 and other external sources, for processing or decoding the content and for transmitting the content to the content display device 206. The content receiver 202 is, for example, a set top box, a television receiver, a digital video recorder, a computing device, a gaming device, or a television, which is generally located at a user's location (such as a user's residence or business). The content receiver 202 is operable to receive content from the content provider 204 (and/or another external source) by way of the transmission link 210. Such content is received by the communications unit 220 of the content receiver 202. The processing unit 224 may execute instructions for causing the data storage unit 226 (such as the non-transitory storage medium 111) to record multiple instances of content for a plurality of programming channels simultaneously within a single file described above in connection with FIG. 1, for playing one of the stored instances of content, and for performing memory jumping operations during replay of the instance of content. The transmission unit 228 may be communicatively coupled to the content display device 206 by way of transmission link 211.

The content provider 204 (such as a satellite programming company, a cable company, an Internet service provider, e.g., an online video service or Internet video provider, and the like) is generally remotely located from the content receiver 202. The content provider transmits content to the communications unit 220 of the content receiver 202 via the transmission link 210. The content transmitted may include metadata specifying recording instructions for the content receiver 202 to automatically record multiple instances of content simultaneously for multiple programming channels described above in connection with FIG. 1.

The content display device 206 is generally arranged proximate to and is communicatively coupled to the content receiver 202 and displays content transmitted by the content receiver 202. While the content display device 206 and the content receiver 202 are depicted as separate components in FIG. 2, the content receiver 202 may be incorporated with the content display device 206. The content display device 206 is, for example, a television, a computer screen, a video screen, or any other display device for displaying content. The content display device 206 is communicatively coupled to the content receiver 202 by way of the transmission link 211.

The controller 208 is generally provided in an area proximate the content receiver 202 and is communicatively coupled to the content display device 206 by way of the transmission link 212, and to the content receiver 202 by way of the transmission link 213. The controller 208 is, for example, a remote control, such as a universal remote control, a dedicated remote control, or a computing device programmed to send command signals (such as selection signals) to the content receiver 202. The controller 208 may be utilized to provide command signals instructing the content receiver 202 to perform the memory jumping operations described above.

Returning to the content receiver 202, the processing unit 224 may be programmed to perform the memory jumping operations upon playing of one of the instances of content having been simultaneously recorded along with multiple instances of content from a number of programming channels. For example, four programming channels and the corresponding four instances of content may be recorded simultaneously, and upon playing of one of the four instances of content stored in the data storage unit 226, the processing unit 224 may perform memory jumping operations such as skipping ahead or back-tracking by a predefined timeframe within the instance of content (such as 30 seconds). This operation may be performed in response to receiving a selection from the controller 208. Upon performing the memory jumping operation, the communications unit 220 transmits the instance of content at the new position within the recorded instance of content.

Playing the instance of content and performing memory jumping operations within an instance of content may involve the processing unit 224 reading metadata associated with an initial frame of the instance of content, such as a packet identifier ("PID") and a presentation timestamp ("PTS"). For example, while playing the instance of content, the processing unit 224 may select only the PID for the instance of content to be played, while ignoring other PIDs within the file of the plurality of simultaneously recorded instances of content. During a memory jumping operation, the processing unit 224 may instruct the data storage unit 226 to search for the PID for the instance of content being played at a different location within the file. The processing unit 224 may compare the PID and PTS metadata of the initial frame at the initial file location (e.g., prior to performing the memory jump) to a subsequent frame after moving locations within the file to determine whether the memory jump operation was accurately performed. PIDs are generally identifiers associated with data streams, such as content streams and supplemental data streams, which identify a channel for the data stream. Several PIDs may be associated with one transponder controlled by the content provider 204 and simultaneously recorded utilizing the system of FIG. 1. By identifying or selecting the correct PID for the instance of content undergoing the memory jumping operation, the content receiver 202 may navigate to a location within the instance of content that is stored within the file of the simultaneously recorded multiple instances of content. A PTS is associated with each frame (e.g. MPEG frame, I-frame, P-frame, B-frame) of an instance of content and may have a resolution of 90 kHz. For example, the content receiver 202 may read the PTS of anchor frames or I-frames and perform the comparison between the frames before and after the memory jump. Thus, by identifying the correct PID for the instance of content and comparing the PTSs of the frames within the instance of content, the content receiver may accurately determine the timeframe between the initial frame and the subsequent frame.

In some implementations, the processing unit 224 dynamically adjusts the movement within the file corresponding to the memory jumping operation based on recording bit rate information such that upon performing the memory jumping operation, the new file location corresponds to the predefined timeframe associated with the memory jumping operation. In some implementations, dynamically adjusting the memory jumping operation is based on the aggregate bit rate at which the multiple instances of content were simultaneously recorded. In addition or alternatively, the dynamic adjustment may be based on an actual recorded bit rate in comparison to the aggregate bit rate at which the multiple instances of content were simultaneously recorded. In another example, the memory jumping operation is dynamically adjusted based on the ratio of the recorded bit rate of the instance of content to the higher aggregate bit rate of the collection of simultaneously recorded instances of content (e.g., 1:3; 1:4; 1:5; 1:10 and so on). In some implementations, the processing unit 224 dynamically adjusts the memory jumping operation based on an average aggregate recorded bit rate. In another implementation, the processing unit 224 dynamically adjusts the memory jumping operation based on an average recorded bit rate. In another example, the average bit rate may be calculated based on an average bit rate of recording of some or all of the simultaneously recorded multiple instances of content. In another example, a bit rate for each of the simultaneously recorded multiple instances of content may be determined, and the bit rates may be weighted and/or averaged. In the examples above, each of the simultaneously recorded multiple instances of content may be stored within the same file. In some implementations, the actual or average aggregate recording bit rate may be calculated periodically or in real time to enable the processing unit 224 to regularly adjust the memory jumping operation parameters.

The content receiver 202, in some implementations, may be further configured to perform refinement operations within the memory jumping operation. For example, while reading the file of simultaneously recorded multiple instances of content within the data storage unit 226 at a first time, the processing unit 224 may execute instructions to read the file at a second time, and the timeframe between first time and the second time may define a memory jumping operation timeframe. The processing unit 224 may compare the memory jumping operation timeframe with a stored predefined memory jumping operation timeframe, and based on the comparison, a refining operation may be performed to adjust the location within the file. The refining operation may be performed one time or multiple times in order to locate a position within the file that corresponds, or most closely corresponds, to the predefined memory jumping operation timeframe. For example, for a memory jumping operation that moves forward or backward within an instance of content by one minute, the location within the file may change from an initial location by a timeframe of 58 seconds, upon a first refinement operation, the location within the file may change by a timeframe of an additional 5 seconds (e.g., to 63 seconds), upon a second refinement operation, the location movement within the file may correspond to backward movement by a timeframe 3.2 seconds (e.g., back to 59.8 seconds), and the processing unit 224 may continue to replay the file after the second refinement operation at 59.8 seconds from the initial file location. The playing time associated with the instance of content may be determined based on PTSs associated with the frames of the instance of content. Because the PTS of a frame at the initial position of the instance of content is known, comparing the PTSs of the subsequent frames enables the processing unit 224 to determine the memory jumping operation timeframe and the refining timeframes. In some cases, the PTSs from anchor frames or I-frames may be used in calculating the memory jumping operation timeframe and refining timeframes. This may be useful at least for the anchor frames or I-frames at the new file locations upon performing the memory jumping operation because, upon replay, the processing unit 224 replays the instance of content beginning at an anchor frame or an I-frame (as opposed to a P-frame or a B-frame or other non-anchor frame from a group of pictures ("GOP")).

Figure 3:
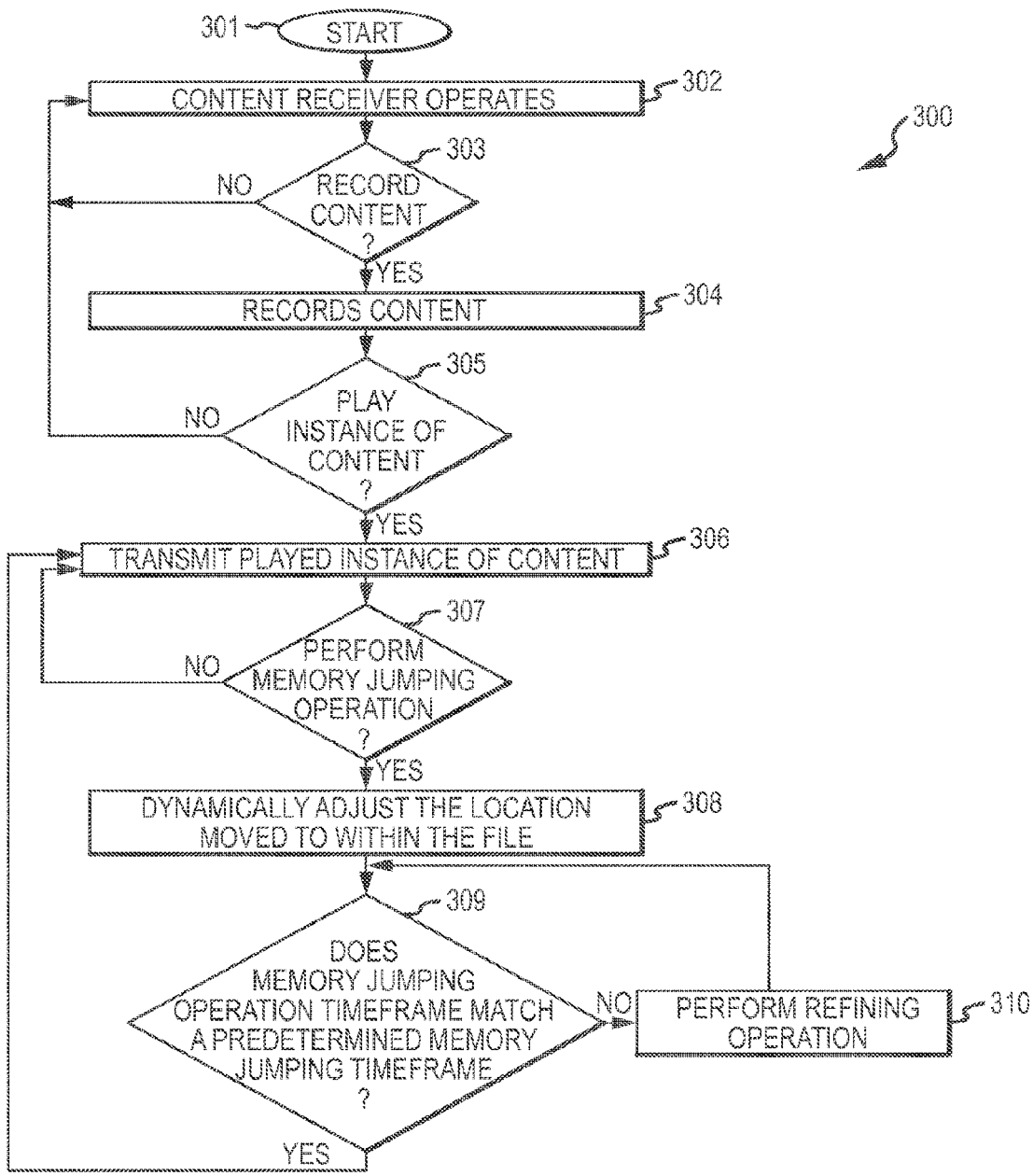
FIG. 3 is a flow chart illustrating a method for memory jumping. This method may be performed by the system of FIG. 2.

FIG. 3 illustrates a method 300 for performing memory jumping operations utilizing a content receiver. The method 300 may be performed by the systems 100 and 200 of FIGS. 1 and 2 respectively. The flow begins at block 301 and proceeds to block 302 where the content receiver operates. The flow then proceed to block 303 where the processing unit 224 determines whether content is to be recorded. If not, the flow returns to block 302. If so, the flow then proceeds to block 304 where the processing unit 224 records content. For example, the processing unit may simultaneously record multiple instances of content from a plurality of programming channels described above in connection with FIGS. 1 and 2. The flow then proceeds to block 305 where the processing unit 224 determines whether one of the instances of content is to be played, for example by transmitting the content to the content display device 206. If not, the flow proceeds to block 302 where the content receiver operates. If so, the flow proceeds to block 306 where the processing unit 224 transmits the played content. The flow then proceeds to block 307 where the processing unit 224 determines whether the processing unit is to perform a memory jumping operation. If not, the flow returns to block 306 where the processing unit 224 transmits content. If a memory jumping operation is to be performed, for example, upon receiving a selection command from the controller 208, the flow proceeds to block 308 where the processing unit dynamically adjusts the location moved to within the file based on one or more recording bit rates, such as the aggregate recording bit rate for the plurality of instance of content. The flow proceeds to block 309 where the processing unit determines whether a memory jumping operation timeframe matches a predetermined memory jumping timeframe. If so, the flow proceeds to block 306 where the processing unit transmits the played content until the processing unit 224 determines whether the processing unit is to perform the memory jumping operation again in operation 307. If not, the flow optionally proceeds to block 310 where the processing unit 224 performs a refining operation. The flow then proceeds back to block 309 where the processing unit determines whether the timeframes match.

Returning to block 308, the processing unit 224 may dynamically configure the memory jumping operation by adjusting location jumps within the file to correspond to predefined memory jumping operation timeframes. In connection with dynamically adjusting the memory jumping operation in block 308, and generally with the processing unit 224 performing the memory jumping operations, the processing unit 224 may incorporate information about the memory jumping operation with on screen display content, which may be provided as an overlay to video content, such as the played instance of content.

Figure 4:
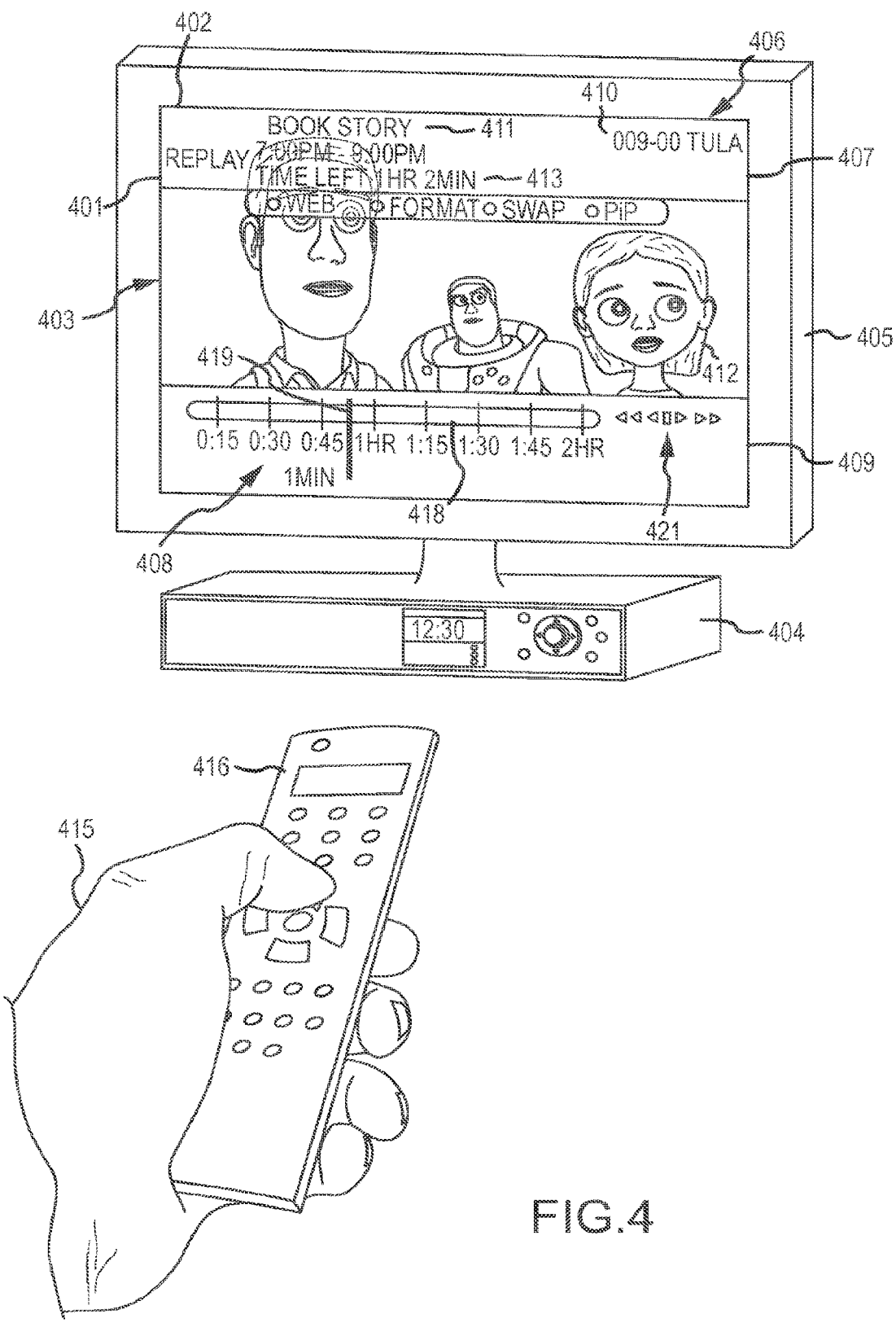
FIG. 4 is a diagram illustrating on screen display content displaying information about memory jumping.

FIG. 4 is a diagram illustrating on screen display content providing information about the memory jumping operation. In FIG. 4, the on screen display content 401 may be provided as an overlay 402 to video content 403 and may be generated utilizing the content receiver 404 such as the content receiver 202 in the system of FIG. 2 and transmitted to the content display device 405. The video content 403 may be the replayed instance of content from the plurality of simultaneously recorded instances of content. The on screen display content 401 includes programming information 406 in an upper region 407 and information about the memory jumping operation 408 in a lower region 409. The upper region 407 includes programming information 406 such as a channel and/or network identifier 410, an identification field 411 identifying the instance of content 412 displayed as the video content 403, a run and/or remaining time field 413 identifying the run time and/or remaining time for the instance of content 412. The instance of content 412 displayed as the video content 403 may be live or previously recorded content. When the instance of content 412 is replayed, such as a replayed instance of content from one of a plurality of instances of content recorded simultaneously described above in connection with FIGS. 1 and 2, the lower region 409 of the on screen display content 401 may display information about the memory jumping operation 408. For example, the user 415 may input selections to perform the memory jumping operation utilizing the controller 416. Upon entering a selection, the content receiver 404 may transmit information about the memory jumping operation 408 selected. In FIG. 4, the user 415 selects a memory jumping operation to cause the replayed instance of content to rewind by one minute. In response, the content receiver 404 performs the memory jumping operation, and in the course of rewinding the instance of content, the content receiver 404 transmits information about the memory jumping operation 408 selected. This may include a time range image 418 and a marker 419 identifying the point in time at which the instance of content 412 is replayed and a memory jumping operation time indicator 420. In FIG. 4, the time range image 418 shows the instance of content 412 is associated with a two hour run time, the marker 419 indicates that the instance of content 412 is replaying at 58 minutes from the start (or 1 hour and 2 minutes from the end), and the memory jumping operation time indicator 420 indicates a one minute backwards memory jumping operation is being or has been performed by the content receiver 404.

In some implementations, the user may select icons within the on screen display content 401 such as the icons 420 displayed in the lower region 409 representing pause, forward, fast-forward, rewind, fast-rewind, and, in response, the content receiver may perform the corresponding memory jumping operation and simultaneously display the information about the memory jumping operation 408.

While the information about the memory jumping operation 408 indicates the memory jumping operation moves backward within the file by a predefined timeframe of one minute, it will be appreciated that the information may represent other predefined timeframes, such as the predefined timeframes described above.

While the information about the memory jumping operation 408 is provided in a separate, lower overlaying region 409, this information may be displayed in any region within the on screen display content 402, alone or in combination with the programming information 410, and the region may be an overlay 402 to any portion of the video content 403 (such as at a left side, right side, middle, center, upper and/or lower portion). In addition, the on screen display content 402 may be partially transparent (e.g., as shown in the upper region 407) or may be opaque (e.g., as shown in the lower region 409).

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for performing a memory jump by a content receiver, the method comprising:
    outputting for playback a content instance from a stored file, wherein:
        the stored file comprises a plurality of content instances recorded from a plurality of television channels;
    receiving input requesting a memory jump operation;

in response to receiving the input requesting the memory jump operation, performing the memory jump operation by jumping to a location within the file, wherein
the memory jump operation is based on an aggregate bit rate of the plurality of content instances of the stored file; and
outputting the instance of content from the location within the stored file.

2. The method for performing the memory jump by the content receiver of claim 1, wherein the memory jump operation is based on a predefined timeframe.

3. The method for performing the memory jump by the content receiver of claim 1, the method further comprising:
determining an amount of movement within the stored file for the memory jump operation based on the aggregate recording bit rate of the plurality of content instances of the stored file.

4. The method for performing the memory jump by the content receiver of claim 1, wherein at least a subset of the plurality of content instances of the stored file have different bit rates.

5. The method for performing the memory jump by the content receiver of claim 1, the method further comprising:
calculating the aggregate bit rate of the stored file.

6. The method for performing the memory jump by the content receiver of claim 1, further comprising:
prior to outputting for playback the content instance, recording the plurality of content instances to the stored file over a same period of time from the plurality of television channels.

7. The method for performing the memory jump by the content receiver of claim 6, wherein the recording is performed using a single tuner of the television receiver.

8. A content receiver configured to perform a memory jump, the content receiver comprising:
one or more tuners;
one or more processors; and
a memory communicatively coupled with and readable by the one or more processors and having stored therein processor-readable instructions which, when executed by the one or more processors, cause the one or more processors to:
cause a content instance to be output for presentation from a stored file, wherein:
the stored file comprises a plurality of content instances recorded from a plurality of television channels;
process received input requesting a memory jump operation;
in response to the input requesting the memory jump operation, perform the memory jump operation by jumping to a location within the file, wherein
the memory jump operation is based on an aggregate bit rate of the plurality of content instances of the stored file; and
cause the instance of content to be output from the location within the stored file.

9. The content receiver configured to perform the memory jump of claim 8, wherein the processor-readable instructions that cause the one or more processors to perform the memory jump operation are based on a predefined timeframe.

10. The content receiver configured to perform the memory jump of claim 8, wherein the processor-readable instructions, when executed, further cause the one or more processors to:
determine an amount of movement within the stored file for the memory jump operation based on the aggregate recording bit rate of the plurality of content instances of the stored file.

11. The content receiver configured to perform the memory jump of claim 8, wherein at least a subset of the plurality of content instances of the stored file have different bit rates.

12. The content receiver configured to perform the memory jump of claim 8, wherein the processor-readable instructions, when executed, further cause the one or more processors to:
calculate the aggregate bit rate of the stored file.

13. The content receiver configured to perform the memory jump of claim 8, wherein the processor-readable instructions, when executed, further cause the one or more processors to:
prior to outputting for playback the content instance, record, using a single tuner of the plurality of tuners, the plurality of content instances to the stored file over a same period of time from the plurality of television channels.

14. A non-transitory processor-readable medium for performing a memory jump, comprising processor-readable instructions configured to cause one or more processors to:
cause a content instance to be output for presentation from a stored file, wherein:
the stored file comprises a plurality of content instances recorded from a plurality of television channels;
process received input requesting a memory jump operation;
in response to the input requesting the memory jump operation, perform the memory jump operation by jumping to a location within the file, wherein
the memory jump operation is based on an aggregate bit rate of the plurality of content instances of the stored file; and
cause the instance of content to be output from the location within the stored file.

15. The non-transitory processor-readable medium for performing the memory jump of claim 14, wherein the processor-readable instructions configured to cause the one or more processors to perform the memory jump operation are based on a predefined timeframe.

16. The non-transitory processor-readable medium for performing the memory jump of claim 14, wherein the processor-readable instructions are further configured to cause the one or more processors to:
determine an amount of movement within the stored file for the memory jump operation based on the aggregate recording bit rate of the plurality of content instances of the stored file.

17. The non-transitory processor-readable medium for performing the memory jump of claim 14, wherein at least a subset of the plurality of content instances of the stored file have different bit rates.

18. The non-transitory processor-readable medium for performing the memory jump of claim 14, wherein the processor-readable instructions are further configured to cause the one or more processors to:
calculate the aggregate bit rate of the stored file.

19. The non-transitory processor-readable medium for performing the memory jump of claim 14, wherein the processor-readable instructions are further configured to cause the one or more processors to:
prior to outputting for playback the content instance, recording the plurality of content instances to the stored file substantially contemporaneously from the plurality of television channels.

20. The transitory processor-readable medium for performing the memory jump of claim 19, wherein the recording is performed using a single tuner of a television receiver.

* * * * *